United States Patent [19]
Lezzi et al.

[11] Patent Number: 5,937,949
[45] Date of Patent: Aug. 17, 1999

[54] PROCESS FOR THE CONSOLIDATION OF SAND

[75] Inventors: Alessandro Lezzi, Milan; Guido Galbariggi, Genoa; Enzo Pitoni, San Zenone Al Lambro, all of Italy

[73] Assignees: AGIP S.p.A.; Eniricerche S.p.A., both of Milan, Italy

[21] Appl. No.: 08/928,128

[22] Filed: Sep. 12, 1997

[30] Foreign Application Priority Data

Sep. 12, 1996 [IT] Italy .................................. MI96A1882

[51] Int. Cl.⁶ ...................................................... E21B 43/22
[52] U.S. Cl. ............................................ 166/401; 166/300
[58] Field of Search .................................... 166/292, 294, 166/300, 268, 400, 401

[56] References Cited

U.S. PATENT DOCUMENTS

| | | | |
|---|---|---|---|
| Re. 31,946 | 7/1985 | Meyer et al. ....................... | 166/295 X |
| 3,070,159 | 12/1962 | Marx . | |
| 3,219,110 | 11/1965 | Martin et al. . | |
| 3,416,603 | 12/1968 | Bernard . | |
| 3,565,176 | 2/1971 | Wittenwyler ............................ | 166/270 |
| 3,593,796 | 7/1971 | Stainback et al. . | |
| 3,640,343 | 2/1972 | Darley . | |
| 3,951,210 | 4/1976 | Wu et al. ................................. | 166/288 |
| 4,031,959 | 6/1977 | Henderson ............................... | 166/307 |
| 5,211,233 | 5/1993 | Shu ......................................... | 166/270 |
| 5,219,026 | 6/1993 | Shu et al. ................................ | 166/278 |
| 5,377,759 | 1/1995 | Surles ..................................... | 166/295 |
| 5,791,415 | 8/1998 | Nguyen et al. ......................... | 166/280 |

FOREIGN PATENT DOCUMENTS 0 462 880  12/1991  European Pat. Off. .

*Primary Examiner*—Frank Tsay
*Attorney, Agent, or Firm*—Oblon, Spivak, McClelland, Maier & Neustadt, P.C.

[57] ABSTRACT

Process for the consolidation of sand in a well which produces fluids, particularly oil and/or gas, comprising the following steps:

1) optional preflush with an aqueous solution of inorganic salts, preferably KCl;
2) injection into the formation of a consolidating agent essentially consisting of an aqueous solution of sodium silicate in water;
3) flushing with an inert gas, preferably nitrogen, of the formation treated in step (2) until the excess consolidating agent and water injected in step (2) have been removed;
4) subsequent introduction into the formation thus treated of an aqueous solution of an acid having a pKa at 25° C. of between 3 and 10, preferably selected from ammonium chloride and acetic acid.

11 Claims, No Drawings

PROCESS FOR THE CONSOLIDATION OF SAND

BACKGROUND OF THE INVENTION

1. Field of the Invention

The present invention relates to a process for the consolidation of formations, in particular, sand. More specifically, the present invention relates to a process for consolidating formations encountered during the drilling of an oil well, at the same time maintaining the permeability of the consolidated zones.

2. Discussion of the Background

It is known that the presence of sand in an oil well causes great drawbacks, for example blocking of the oil flow (or gas) and damage to the equipment used for the drilling.

Patent literature describes various methods for consolidating sand encountered during the drilling of a well.

For example, U.S. Pat. No. 3,481,403 describes a process for the consolidation of sand which comprises the injection of an alkyl ether and subsequently a resin. There are other variations in literature which are always based on the use of various kinds of resins.

All processes using resins are particularly complex and delicate as the above compositions must be prepared with very strict procedures and may therefore be ineffective in the presence of unexpected contaminations.

Another disadvantage of the use of resins consists in the high viscosity (>20 cP) of their solutions to be injected into the formation, a viscosity which prevents the treatment of formations having permeabilities of less than 50 mD.

Another method used for consolidating sand consists in the use of sodium silicate together with various "setting" agents, as described in U.S. Pat. No. 1,421,706 and U.S. Pat. No. 3,175,611.

Also the use of sodium silicate however has disadvantages, in particular a reduction in the permeability of the consolidated formation.

SUMMARY OF THE INVENTION

A process has now been found for the consolidation of sand in oil or gaseous wells which overcomes the inconveniences described above.

In accordance with this, the present invention relates to a process for the consolidation of sand in wells which produces fluids, particularly oil and/or gas, comprising the following steps:

1) optional preflush with an aqueous solution of inorganic salts, preferably KCl;
2) injection into the formation of a consolidating agent essentially consisting of an aqueous solution of sodium silicate in water;
3) flushing with an inert gas, preferably nitrogen, of the formation treated in step (2) until the excess consolidating agent and water injected in step (2) have been removed;
4) subsequent introduction into the formation thus treated of an aqueous solution of an acid having a pKa at 25° C. of between 3 and 10, preferably selected from ammonium chloride and acetic acid.

DETAILED DESCRIPTION OF PREFERRED EMBODIMENTS

The process of the present invention consists in a series of steps which must be followed in succession.

Step (1), or the preflush, is not essential in the process of the present invention, but is desirable however in that it allows substances to be removed which can interfere with the subsequent phases and, above all, with the formation water.

Preflush agents which can be used are saline solutions, particularly of potassium chloride and sodium chloride.

The optional step (1) also allows, in terms of wettability, the surfaces to be prepared for the subsequent step (2).

Step (2) consists in the introduction of an aqueous solution of sodium silicate into the formation.

The term sodium silicate is applied to substances having a varying ratio $Na_2O/SiO_2$, usually between 1/2.40 and 1/3.85.

The solution of sodium silicate has a content of water preferably of between 20 and 90% by weight.

As is known to experts in the field, sodium silicate is a typical consolidating or binding agent.

Step (3) essentially consists in flushing the formation treated with sodium silicate with an inert gas, preferably nitrogen. This operation enables the excess sodium silicate to be removed from the interstices of the formation, with the aim of leaving a film of sodium silicate around each grain of sand. Step (3) also has the purpose of removing the excess water and favouring adhesion to the particles of sand of the silicate fed in step (2).

It is therefore important for step (3) to be carried out with an anhydrous inert gas for a sufficient time to remove the water and allow stable adhesion of the silicate to the sand.

Indicatively step (3) involves treatment with an inert gas for a time of between 2 and 10 hours, preferably between 4 and 6 hours, with a flow rate of between 500 and 4000 scf/h, preferably between 1000 and 1500 scf/h.

Finally step (4) consists in introducing into the formation thus treated obtained at the end of step (3), an aqueous solution essentially consisting of an aqueous solution of an acid having a pKa of between 3 and 10, preferably acetic acid and/or ammonium chloride. It is preferable for the solution of acid to have a content of water of between 10 and 90%.

It is important for the acids to have a pKa within the range indicated above. In fact stronger acids have the disadvantage of interacting with compounds possibly present in the formation, with the consequent blockage of the formation itself. On the other hand weaker acids would not have the necessary strength to cause the formation of silica from the silicate.

EXAMPLES

The following examples provide a better understanding of the present invention.

Example 1

A viton tube with a diameter of 2.54 cm and a length of 10 cm. is filled with sand having a particle size of 53–75 $\mu$m. The tube is then inserted into a Hassler cell; a pressure of about 20 kg/cm$^2$ is then applied on the tube filled with sand, using a pneumatic system. An aqueous solution of KCl at 3% by weight is then passed through the sand. The initial permeability of the sand was determined by measuring the flow reduction at different flow-rates using the Darcy equation.

An aqueous solution of sodium silicate (for the preparation of the solution, a mother solution of sodium silicate 40°Be diluted at 70% was used) was then injected into the sand. The viscosity of the solution of sodium silicate was 10 cP at 25° C. The flushing of the solution of silicate was maintained, with a flow rate of 60 ml/h, for about 2 hours at 60° C. At the end of the two hours the flushing of the silicate was interrupted and the flushing of nitrogen started. In the first few minutes of nitrogen flushing the solution of silicate washed away by the nitrogen itself was collected (about 20 ml). The flushing of nitrogen was maintained for 12 hours at a temperature of 60° C. with a flow rate of about 20 $dm^3$/h. The stream of nitrogen was then interrupted and an aqueous solution of ammonium chloride at 15% by weight was flushed into the sand. The aqueous stream of ammonium chloride was maintained at a flow rate of 60 ml/h for about 3 hours. The final permeability of the consolidated sand was then determined by measuring the flow reduction due to the passage at room temperature of a solution of aqueous KCl (at 3% by weight), at different flow rates.

The Hassler cell was finally disassembled and the consolidated sand removed from the viton tube. The degree of consolidation was determined by compression strength measurements using an Instron press.

The results are shown in table 1.

Example 2

The same operating procedures described in example 1 are used. The sand used has a particle size <53 $\mu$m. The initial and final permeabilities were determined as in example 1. The degree of consolidation was determined by mechanical resistance measurements using an Instron press.

The results are shown in table 1.

Example 3

The equipment used is that described in example 1. The same sand and solution of sodium silicate as in example 1 are used, with identical injection procedures. The nitrogen was flushed with the same flow rate and for the same time as in example 1. At the end of the nitrogen flushing an aqueous solution of acetic acid at 20% by weight was flushed. The stream of aqueous acetic acid was maintained at a flow rate of 60 ml/h for about 3 hours. The final permeability was determined by measuring the flow reduction at different flow rates due to the passage of an aqueous solution of KCl (3% by weight). The degree of consolidation was determined by compression strength measurements using an Instron press.

The results are shown in table 1.

Comparative Example 4

The same operating procedure is used as in example 1. The flushing of nitrogen was maintained for one hour, instead of 12 hours. At the end an aqueous solution of ammonium chloride (15% by weight) was injected into the sand. The initial and final permeabilities were determined as in example 1. The degree of consolidation was determined by mechanical resistance measurements using an Instron press.

The results are shown in table 1.

Example 5

The same operating procedure is used as in example 2. The sand used comes from a well producing gas situated in Southern Italy, and has an average particle size of 84 $\mu$m. The initial and final permeabilities were determined as in example 1. The degree of consolidation was determined by mechanical resistance measurements using an Instron press.

The results are shown in table 1.

Example 6

The same operating procedure is used as in example 2. The sand used comes from a well producing gas situated in the Adriatic Sea and has an average particle size of 40 $\mu$m. The degree of consolidation was determined by mechanical resistance measurements using an Instron press.

The results are shown in table 1.

TABLE 1

| EX. | granul. sand ($\mu$m) | acid | init. K (mD) | fin. K (mD) | fin. K/ in. K (%) | Break. load (kg/cm$^2$) |
|---|---|---|---|---|---|---|
| 1 | 53–75 | amm-chl | 1203 | 190 | 16 | 10 |
| 2 | <53 | amm-chl | 674 | 118 | 17 | 20 |
| 3 | 53–75 | ace-ac | 1256 | 202 | 16 | 12 |
| 4c | 53–75 | amm-chl | 1230 | 12 | 1 | n.c. |
| 5 | 84* | ace-ac | 8 | 17 | 212 | 24 |
| 6 | 40* | ace-ac | 22 | 35 | 160 | 13 |

Notes for table 1: the symbol * means an average particle size value; amm-chl is ammonium chloride; ace-ac is acetic acid; n.c. means non-consolidated sand.

From examples 1, 2 and 3 it can be noted that the sand is consolidated with silicates after prolonged action of nitrogen and using two weak acids as setting agents (ammonium chloride or acetic acid). In these tests the permeability is recovered at a rate of 15–20%.

From comparative example 4 it can be noted that the prolonged dehydration action of the nitrogen is necessary for effecting the consolidation and restoring the permeability.

From examples 5 and 6, it can be noted that the sand with low permeability, coming from productive formations, is efficiently consolidated; the final permeability after consolidation is greater than the initial permeability due to the stimulating action of the acid on the sand. This phenomenon is due to the presence of carbonates in the formation sand which are partially dissolved by action of the acid, making the consolidated sand more permeable than the initial non-consolidated sand.

We claim:

1. A process for the consolidation of sand in a well which produces fluids, particularly oil and/or gas, comprising the following steps:
   1) preflush with an aqueous solution of an inorganic salt;
   2) injection into the formation of a consolidating agent essentially consisting of an aqueous solution of sodium silicate in water;
   3) flushing with an inert gas of the formation treated in step (2) until the excess consolidating agent and water injected in step (2) have been removed;
   4) subsequent introduction into the formation thus treated of an aqueous solution of an acid having a pKa at 25° C. of between 3 and 10.

2. The process according to claim 1, wherein step (3) is carried out by flushing with nitrogen.

3. The process according to claim 1, wherein the inert gas is fed into the formation for a time of between 2 and 10 hours, with a flow rate of 1000 to 1500 scf/h.

4. The process according to claim 3, wherein the inert gas is fed into the formation for a time of between 4 and 6 hours, with a flow rate of 1000 to 1500 scf/h.

5. The process according to claim 1, characterized in that step (4) consists in the introduction into the formation of an aqueous solution of an acid selected from ammonium chloride and acetic acid.

6. The process according to claim 1 wherein the inorganic salt used in step (1) is NaCl or KCl.

7. A process for the consolidation of sand in a well which produces fluids, particularly oil and/or gas, comprising the following steps:

1.) injection into the formation of a consolidating agent essentially consisting of an aqueous solution of sodium silicate in water;

2.) flushing with an inert gas of the formation treated in step (1) until the excess consolidating agent and water injected in step (1) have been removed; and 3.) subsequent introduction into the formation thus treated of an aqueous solution of an acid having a pKa at 25° C. of between 3 and 10.

8. The process according to claim 7, wherein step (2) is carried out by flushing with nitrogen.

9. The process according to claim 7, wherein the inert gas is fed into the formation for a time of between 2 and 10 hours, with a flow rate of 1000 to 1500 scf/h.

10. The process according to claim 7, wherein the inert gas is fed into the formation for a time of between 4 and 6 hours with a flow rate of 1000 to 1500 scf/h.

11. The process according to claim 7, wherein step (3) consists in the introduction into the formation of an aqueous solution of an acid selected from ammonium chloride and acetic acid.

* * * * *

UNITED STATES PATENT AND TRADEMARK OFFICE
CERTIFICATE OF CORRECTION

PATENT NO. : 5,937,949

DATED : August 17, 1999

INVENTOR(S): Alessandro LEZZI, et al.

It is certified that an error appears in the above-identified patent and that said Letters Patent is hereby corrected as shown below:

On the title page, item [30] should be:

--[30]   Foreign Application Priority Data
    Sep. 13, 1996 [IT] Italy ............... MI96A001882--

Signed and Sealed this

Twenty-fifth Day of July, 2000

Attest:

Q. TODD DICKINSON

*Attesting Officer*          *Director of Patents and Trademarks*